United States Patent

Yokota et al.

[11] 4,385,809
[45] May 31, 1983

[54] COPYING LENS

[75] Inventors: Minoru Yokota; Masamichi Kitagawa, both of Hachioji, Japan

[73] Assignee: Konishiroku Photo Industry Co., Ltd., Tokyo, Japan

[21] Appl. No.: 183,383

[22] Filed: Sep. 2, 1980

[30] Foreign Application Priority Data

Sep. 7, 1979 [JP] Japan ................ 54-114142

[51] Int. Cl.³ .......................................... G02B 9/14
[52] U.S. Cl. ................................ 350/475; 350/446
[58] Field of Search ............ 350/444, 446, 465, 442, 350/475

[56] References Cited

U.S. PATENT DOCUMENTS 4,173,396  11/1979  Yokota .................. 350/465

FOREIGN PATENT DOCUMENTS 113013  9/1980  Japan .................... 350/446

*Primary Examiner*—John K. Corbin
*Assistant Examiner*—Rebecca D. Gass
*Attorney, Agent, or Firm*—Jordan B. Bierman; Linda Bierman

[57] ABSTRACT

A copying lens system of three lenses is provided in which the total length is less than 0.15f with aberration fully corrected. This is brought about by a three-lens system in which the first lens is a positive meniscus whose convex surface faces the object side, a negative second lens with a concave surface at both ends, and a positive third lens with a convex surface at both ends, the rear surface being a reflection surface. The dimension of the lenses must satisfy the following condition:

$$5f < |r_6| < 8f$$

and $$0.5f < r_2 < 2f$$

wherein f represents the composite focal length of the total system, $r_2$ represents the radius of curvature of the surface of the lens that stands second from the object side, and $r_6$ represents the radius of curvature of the surface of the lens that stands sixth from the object side.

1 Claim, 7 Drawing Figures

FIG. 1A
FIG. 1B
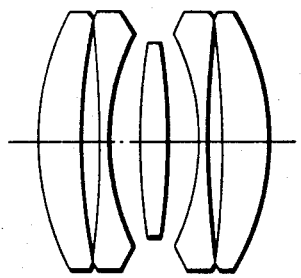
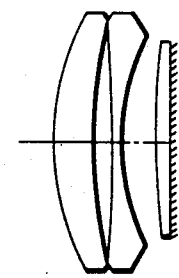
FIG. 2
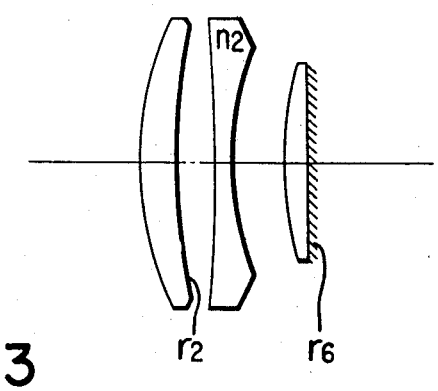
FIG. 3
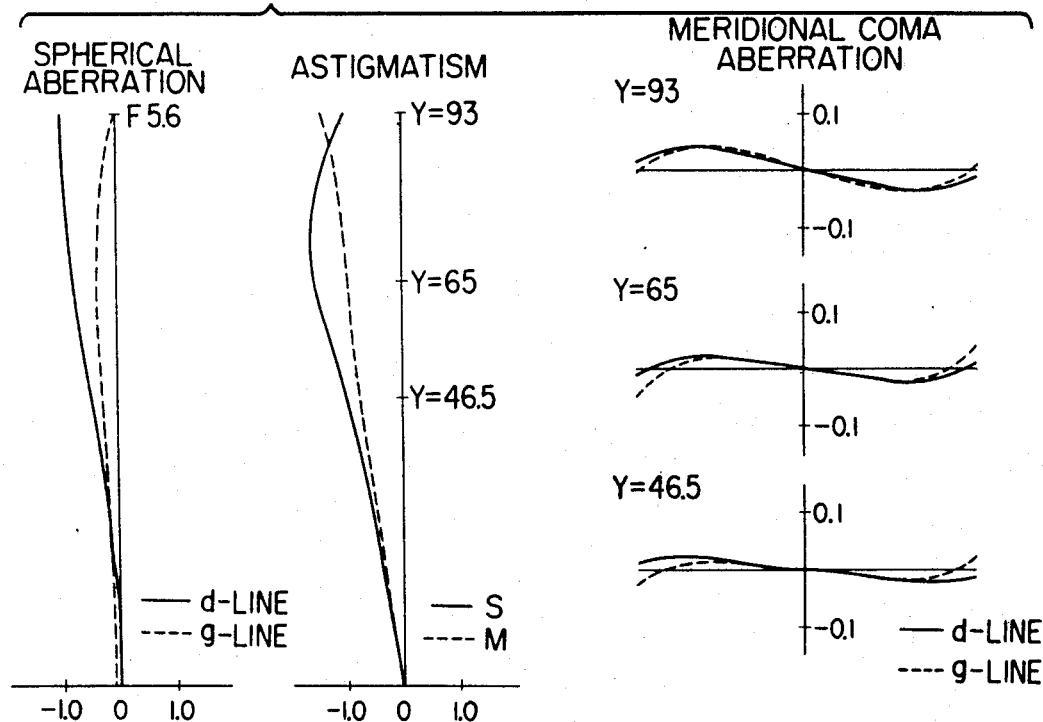

COPYING LENS

BACKGROUND OF THE INVENTION

This invention relates to the copying lens that is used at the magnification of one to one and thereabout and has a reflection surface.

With the recent spread in usage of copying machines, a copying lens with symmetrical structure that is divided at its symmetrical surface, and in which said symmetrical surface serves as a reflection surface, has widely been used in order to reduce the total size of the machine and lens cost; furthermore a copying lens with a reflection surface in which the symmetrical surface has a radius of curvature has been actively developed recently.

In the publicly-known lens system of such a form, for example in the lens system described in the specification of Japanese Patent Examined Publication No. 25734/1977 or of Japanese Patent Publication Open to public Inspection No. 66257/1975, the total length of the lens (the length from an apex of the first surface to an apex of a reflection surface) is more than 0.19 f against the composite focal length f of the lens and therefore it has not necessarily satisfied the requirement for the development of a smaller and less expensive lens.

With constant F number and angle of view, if it is possible to make the total length of the lens short, it is inevitably possible to make the lens diameter small, and the reduction in total length and diameter naturally leads to the saving of lens material and less processing fees.

SUMMARY OF THE INVENTION

An object of this invention is to offer a lens system wherein the total length thereof is less than 0.15 f with an ordinary angle of view (covering power 2ω is about 50°) and F number (F: 5.6, and thereabout) and yet with the aberration fully corrected.

BRIEF DESCRIPTION OF DRAWINGS

FIGS. 1A and 1B are a diagrammatic sectional views of the lens of U.S. Pat. No. 4,173,396;

FIG. 2 is a diagrammatic sectional view of the lens of the first example of this invention; and FIG. 3 through FIG. 6 are an aberration curve diagrams for the magnification of one to one and with f=100 on the examples number one through number four of this invention, respectively.

DETAILED DESCRIPTION OF THE PREFERRED INVENTION

Figure 4:
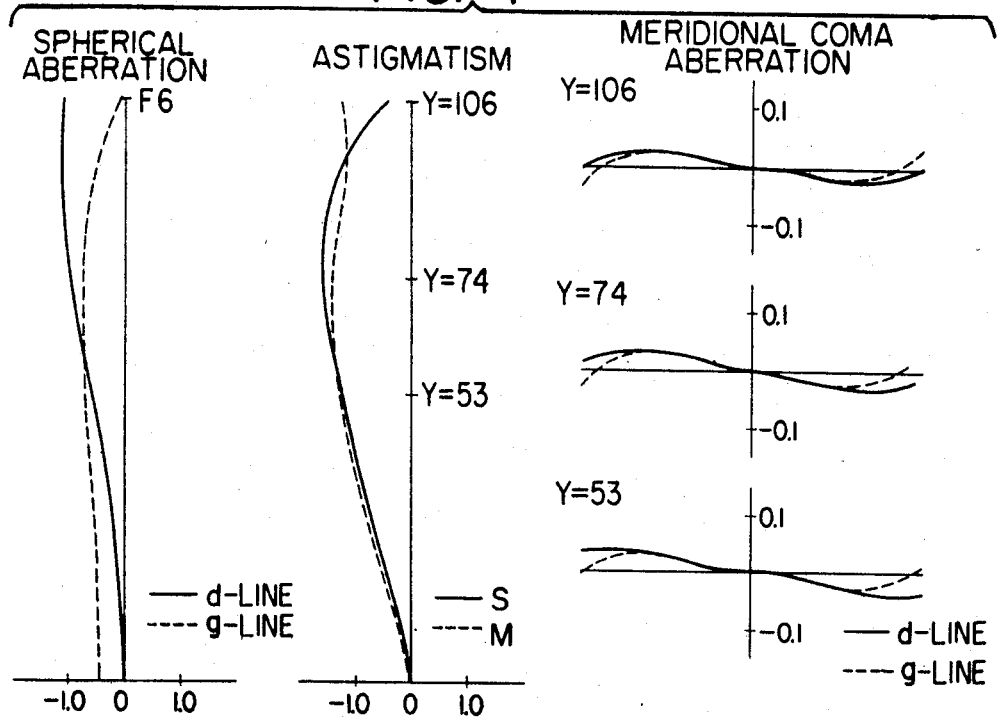
Figure 5:
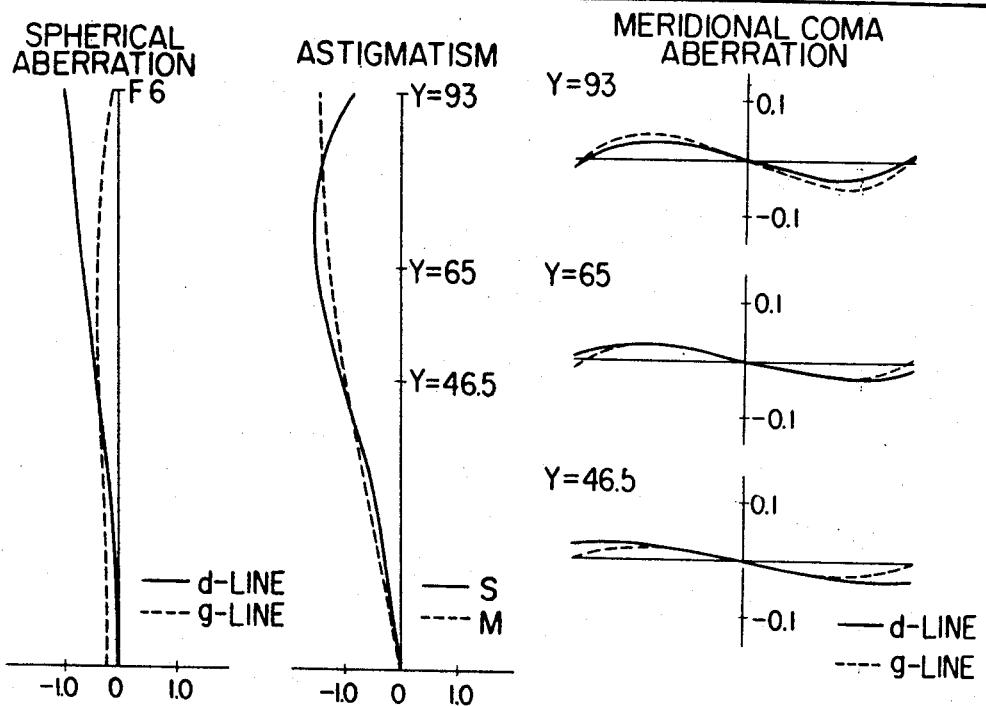
Figure 6:
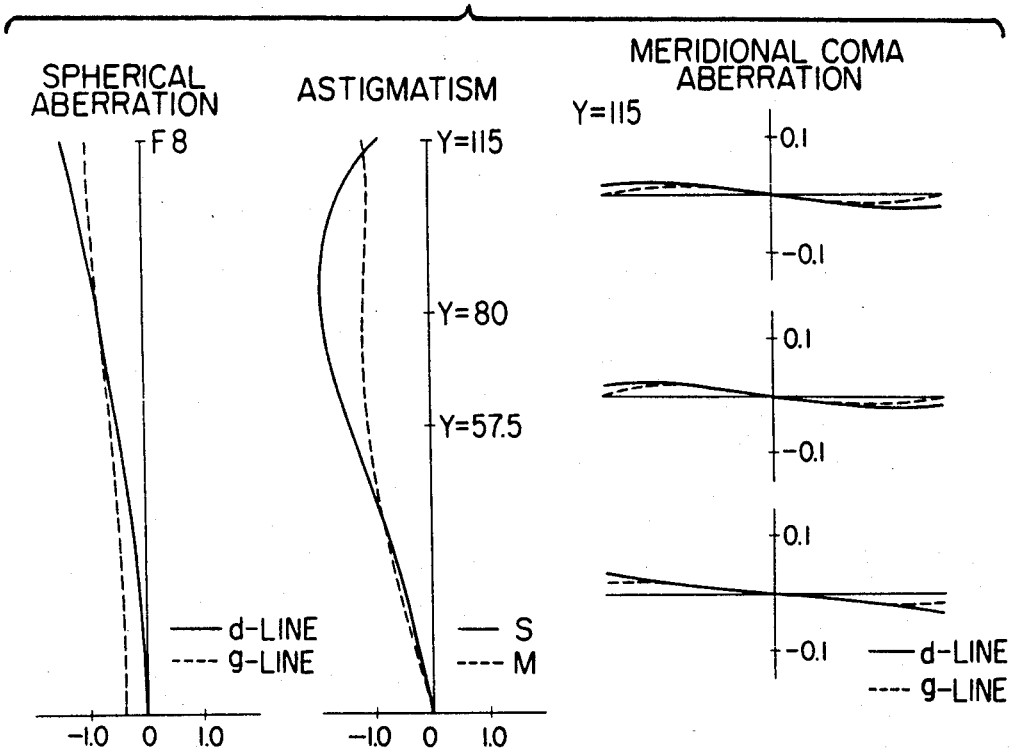

In order to attain the desired object, the lens system of this invention is characterized in that in a lens system of three elements comprising, as is shown in FIG. 2, a first lens of positive meniscus, the convex surface of which faces the object side, a negative second lens with concave surface at both ends, and a positive third lens with a convex surface at both ends, the rear surface of which is a reflection surface, the conditions of $$5f < |r_6| < 8f \quad (1)$$

$$0.5f < r_2 < 2f \quad (2)$$

are satisfied when f represents the composite focal length of the total system, $r_2$ represents the radius of curvature of the surface of the lens that stands second from the object side, and $r_6$ represents the radius of curvature of the surface of the lens that stands sixth from the object side; $r_n$ would represent the radius of curvature of the surface of the lens that stands "n"th from the object side.

Generally, when a concave reflection surface is introduced to a lens system, the reflection surface has the following effect:

1. The reflection surface itself has the effect of a positive lens (convergent effect);
2. negative Petzval is generated; and
3. chromatic aberration is not generated.

Therefore, as an entire lens system, the following advantageous conditions are presented:

1. Since a part of the convergent effect of the total system is done by the concave reflection surface, the convergent power of the other positive lens is weakened and at the same time the divergent power of the negative lens to correct the aberration generated in the positive lens is also weakened and therefore it is possible to restrain the generation of an aberration of a high order that is apt to occur in the lens with high refractive power.
2. It is not necessary to use an expensive glass material with a high refractive index for the positive lens when reducing a Petzval sum.
3. It is possible to restrain the generation of the chromatic aberration of the total system to a low level.

This invention corresponds to the copying lens of U.S. Pat. No. 4,173,396 invented earlier by this applicant, and shown in FIGS. 1A and 1B, in which such concave reflection surface is introduced, and it is apparently possible to reduce a Petzval sum by making the rear surface of the third lens element the concave reflection surface. At the same time it has the function to make the meridional image surface considerably over corrected due to the fact that the angle between the incident light and the normal becomes large by the angle of view.

The condition (1) is a condition to obtain an image surface with less astigmatism by keeping a balance of the under corrected meridional image surface curvature of field that is generated on the other composition lens, reducing the Petzval sum. If $|r_6|$ becomes large exceeding the upper limit, it causes less generation of negative Petzval sum and leads to the image surface with large curvature of field on the whole. If, on the contrary, it becomes small exceeding the lower limit, it causes the reduction of the Petzval sum but the meridional image surface considerably becomes over corrected and it prevents the under-corrected meridional image surface that is generated on the other lens element from compensating, and leads to an over-compensated image surface on the whole.

The condition (2) is a condition to restrain the generation of the high order meridional image surface curvature of field by lessening the difference of the beam that enters the second surface in terms of the angle of view for aiming the wide-angle lens. If $r_2$ is enlarged to exceed this upper limit, a high order under-corrected meridional image surface curvature of field is generated, and it leads to an image surface with great astigmatism. If $r_2$, on the contrary, is reduced to exceed the lower limit, a high order over corrected meridional image surface curvature of field is generated.

When all lens elements are composed of a single lens, it is desirable that the refractive index $n_2$ of the second lens satisfies the condition of $$1.63 < n_2 \quad (3)$$

to guarantee of an excellent image quality with less flare.

Because it is possible to make the total Petzval sum small with the condition (1), it is possible to make the refractive index of the negative second lens high and, in its turn, it is possible to make the radius of curvature $r_3$ of the front surface of the second lens large and therefore it is possible to restrain the over flare that is generated drastically on this surface. If $n_2$ is reduced to exceed this lower limit of the condition (3), it leads to the over corrected spherical aberration causing the image quality with a large coma flare.

Examples of this invention that satisfy the above-mentioned conditions are shown as follows.

Composite focal length of total system $f = 1.0$ $r_n$: The radius of curvature of the surface of the lens that stands "n"th from the object side.

$d_n$: Distance of the surfaces of the lens that stands "n"th from the object side.

$n_n$: The refractive index for d-line of the composing glass of the lens that stands "n"th from the object side.

$\nu_n$: Abbe number of the composing glass of the lens that stand "n"th from the object side.

$\Sigma d$: Total length of the lens $\omega$: Angle of view

EXAMPLE 1

| | f = 1 | F:5.6 | $\omega = \pm 25°$ | $\Sigma d = 0.1424$ |
|---|---|---|---|---|
| | r | d | n | $\nu$ |
| 1 | 0.2767 | 0.0320 | 1.58913 | 61.1 |
| 2 | 1.3439 | 0.0300 | | |
| 3 | −2.6355 | 0.0164 | 1.66755 | 41.9 |
| 4 | 0.2940 | 0.0480 | | |
| 5 | 0.6016 | 0.0160 | 1.58144 | 40.7 |
| 6 | −7.0450 (reflection surface) | | | |

EXAMPLE 2

| | f = 1 | F:6 | $\omega = \pm 28°$ | $\Sigma d = 0.1149$ |
|---|---|---|---|---|
| | r | d | n | $\nu$ |
| 1 | 0.2372 | 0.0323 | 1.58913 | 61.1 |
| 2 | 1.0414 | 0.0080 | | |
| 3 | −3.7240 | 0.0154 | 1.67003 | 47.3 |
| 4 | 0.2611 | 0.0423 | | |
| 5 | 0.5872 | 0.0169 | 1.54072 | 47.2 |
| 6 | −5.9690 (reflection surface) | | | |

EXAMPLE 3

| | f = 1 | F:6 | $\omega = \pm 25°$ | $\Sigma d = 0.1431$ |
|---|---|---|---|---|
| | r | d | n | $\nu$ |
| 1 | 0.2867 | 0.0336 | 1.60311 | 60.7 |
| 2 | 1.6299 | 0.0280 | | |
| 3 | −2.6041 | 0.0180 | 1.70154 | 41.1 |
| 4 | 0.3098 | 0.0476 | | |
| 5 | 0.6629 | 0.0160 | 1.60342 | 38.0 |
| 6 | −6.6293 (reflection surface) | | | |

EXAMPLE 4

| | f = 1 | F:8 | $\omega = \pm 30°$ | $\Sigma d = 0.1210$ |
|---|---|---|---|---|
| | r | d | n | $\nu$ |
| 1 | 0.2306 | 0.0273 | 1.58913 | 61.1 |
| 2 | 0.9412 | 0.0072 | | |
| 3 | −7.5307 | 0.0186 | 1.67003 | 47.3 |
| 4 | 0.2533 | 0.0406 | | |
| 5 | 0.5933 | 0.0273 | 1.54072 | 47.2 |
| 6 | −5.9293 (reflection surface) | | | |

As seen in each example mentioned above, the total length of the lens system is less than 0.15 f and the lens system is very small. Furthermore, the so-called old type glass the refractive index of which is less than 1.65 can be used for every positive lens composing each lens system and it is possible to reduce the cost of the lens.

On the other hand, as seen in each aberration diagram, each aberration is well-corrected and the $\nu$ values of the glass used in each lens are comparatively large, that is, the glass with less dispersion can be used and the generation of the total chromatic aberration is limited.

It is to be noted that while the convex surface of the first lens is stated above as facing the object side, it can just as well face the image side since in a mirror lens system object side and image side are the same.

What is claimed is:

1. In a copying lens system of three lenses comprising a first lens of positive meniscus, the convex surface of which faces the object side, a negative second lens having a concave surface at both ends, and a positive third lens having a convex surface at both ends, the rear surface of which is a reflection surface, the improvement comprising dimensioning said lenses to satisfy the following conditions:

$$5 f < |r_6| < 8 f$$

and $$0.5 f < r_2 < 2 f$$

in which f represents the composite focal length of the total system, $r_2$ represents the radius of curvature of the surface of the lens that stands second from the object side, and $r_6$ represents the radius of curvature of the surface of the lens that stands sixth from the object side.

* * * * *